(12) United States Patent  
Foster

(10) Patent No.: US 8,793,524 B2
(45) Date of Patent: Jul. 29, 2014

(54) METHOD AND APPARATUS FOR SYNCHRONISING THE LOCAL TIME OF A PLURALITY OF INSTRUMENTS

(75) Inventor: Peter Graham Foster, Parkside (AU)

(73) Assignee: Chronologic Pty. Ltd., Adelaide (AU)

( * ) Notice: Subject to any disclaimer, the term of this patent is extended or adjusted under 35 U.S.C. 154(b) by 117 days.

(21) Appl. No.: 13/320,346

(22) PCT Filed: May 20, 2010

(86) PCT No.: PCT/AU2010/000603
§ 371 (c)(1),
(2), (4) Date: Nov. 14, 2011

(87) PCT Pub. No.: WO2010/132942
PCT Pub. Date: Nov. 25, 2010

(65) Prior Publication Data
US 2012/0060045 A1    Mar. 8, 2012

Related U.S. Application Data

(60) Provisional application No. 61/179,904, filed on May 20, 2009.

(51) Int. Cl.
*G06F 1/12* (2006.01)
*G06F 13/40* (2006.01)
*H04L 7/04* (2006.01)

(52) U.S. Cl.
CPC ........ *G06F 13/4027* (2013.01); *G06F 13/4022* (2013.01); *G06F 13/405* (2013.01); *G06F 1/12* (2013.01); *G06F 2213/0042* (2013.01); *H04L 7/04* (2013.01)
USPC ...................................................... 713/400

(58) Field of Classification Search
USPC ............................................................ 713/400
See application file for complete search history.

(56) References Cited

U.S. PATENT DOCUMENTS 5,566,180 A    10/1996  Eidson et al.
6,278,710 B1   8/2001   Eidson
(Continued)

FOREIGN PATENT DOCUMENTS

WO    WO 2007/092997 A1    8/2007
WO    WO 2008/125043 A1    10/2008

OTHER PUBLICATIONS

"Universal Serial Bus Specification," Apr. 27, 2000; pp. 1-622; Revision 2.0.
(Continued)

*Primary Examiner* — Paul R Myers
(74) *Attorney, Agent, or Firm* — Oliff PLC

(57) ABSTRACT

A method of determining the downstream propagation time of signals from a USB Host Controller across one or more USB cables and one or more USB Hubs to a SuperSpeed USB device, including locking a clock of the SuperSpeed USB device to information that includes a first timestamp, transmitting a plurality of signals to the USB Host Controller, each of the signals containing a second timestamp indicative of a local time of the SuperSpeed USB device when the respective signal was generated by the SuperSpeed device; the USB Host Controller creating a third timestamp indicative of a time of reception from the SuperSpeed USB device; determining a time period from one or more respective time differences between corresponding second and third timestamps, the time period being indicative of a sum of a downstream propagation time and an upstream propagation time; and determining the downstream propagation time from the time period.

17 Claims, 3 Drawing Sheets

(56) References Cited

U.S. PATENT DOCUMENTS

| | | | |
|---|---|---|---|
| 6,343,364 B1 | 1/2002 | Leydier et al. | |
| 6,665,316 B1 | 12/2003 | Eidson | |
| 6,741,952 B2 | 5/2004 | Eidson | |
| 6,925,062 B2 * | 8/2005 | Tanaka et al. | 370/241.1 |
| 6,975,618 B1 * | 12/2005 | Smith et al. | 370/350 |
| 7,058,020 B2 * | 6/2006 | Tavana et al. | 370/252 |
| 7,080,160 B2 * | 7/2006 | Cognet et al. | 709/248 |
| 7,251,199 B2 * | 7/2007 | Eidson | 368/46 |
| 7,319,345 B2 * | 1/2008 | Farjad-rad et al. | 327/99 |
| 7,539,793 B2 | 5/2009 | Foster et al. | |
| 7,610,175 B2 * | 10/2009 | Eidson | 702/187 |
| 7,778,283 B2 * | 8/2010 | Eidson | 370/503 |
| 8,289,871 B2 * | 10/2012 | Kihara | 370/252 |
| 8,428,045 B2 * | 4/2013 | Gelter et al. | 370/350 |
| 2004/0088445 A1 | 5/2004 | Weigold et al. | |
| 2005/0108600 A1 * | 5/2005 | Arguelles | 714/701 |
| 2009/0222685 A1 | 9/2009 | Foster et al. | |
| 2009/0245227 A1 * | 10/2009 | Chin et al. | 370/350 |

OTHER PUBLICATIONS

"Universal Serial Bus 3.0 Specification," Nov. 12, 2008; Revision 1.0.

International Search Report issued in International Application No. PCT/AU2010/000603 on Jul. 30, 2010.

International Preliminary Report on Patentability issued in International Application No. PCT/AU2010/000603 on Jul. 1, 2011.

* cited by examiner

METHOD AND APPARATUS FOR SYNCHRONISING THE LOCAL TIME OF A PLURALITY OF INSTRUMENTS

RELATED APPLICATION

This application is based on and claims the benefit of the filing date of U.S. application No. 61/179,904 filed 20 May 2009, the content of which as filed is incorporated herein by reference in its entirety.

FIELD OF THE INVENTION

The present invention relates to a method and apparatus for providing a synchronization and timing system, with connectivity based on revision three of the Universal Serial Bus (USB) architecture (or USB 3.0), of particular but by no means exclusive use in providing clocks, data acquisition and automation and control of test and measurement equipment, instrumentation interfaces and process control equipment, synchronized to an essentially arbitrary degree in either a local environment or in a distributed scheme.

BACKGROUND OF THE INVENTION

The USB specification up to and including revision 2.0 was intended to facilitate the interoperation of devices from different vendors in an open architecture. USB 2.0 data is encoded using differential signalling (viz. in which two wires transfer the information) in the form of the difference between the signal levels of those two wires. The USB 2.0 specification is intended as an enhancement to the PC architecture, spanning portable, desktop and home environments.

However, USB was user focussed so the USB 2.0 specification lacked a mechanism for synchronising devices to any great precision. Several proposals attempted to address this and other deficiencies. For example, U.S. Pat. No. 6,343,364 (Leydier et al.) discloses an example of frequency locking to USB traffic, which is directed toward a smart card reader. This document teaches a local, free-running clock that is compared to USB SYNC and packet ID streams; its period is updated to match this frequency, resulting in a local clock with a nominal frequency of 1.5 MHz. This provides a degree of synchronization sufficient to read smart card information into a host PC but, as this approach is directed to a smart card reader, inter-device synchronization is not addressed.

WO 2007/092997 (Foster et al.) discloses a synchronized USB device that allows the generation of accurate clock frequencies on board the USB device regardless of the accuracy of the clock in the Host PC. The USB SOF packet is decoded by the USB device, and treated as a clock carrier signal instead of acting as a clock reference.

The carrier signal, once decoded from the USB traffic, is combined with a scaling factor to generate synchronization information and hence to synthesize a local clock signal with precise control of the clock frequency. In this way, the frequency of the local clock signal can be more accurate than the somewhat ambiguous frequency of the carrier signal.

This arrangement is said to be able to produce a local clock signal to arbitrarily high frequencies, such as a clock frequency of tens of megahertz, and thus to ensure that the local clock of each device connected to a given USB is synchronized in frequency. U.S. application Ser. No. 10/620,769 also teaches a method and apparatus to further synchronize multiple local clocks in phase by measurement of signal propagation time from the host to each device and provision of clock phase compensation on each of the USB devices.

U.S. patent application Ser. No. 12/279,328 (Foster et. al.) teaches synchronisation of the local clocks of a plurality of USB devices to a timebase received from another interface. In one embodiment, a USB device contains a local clock that is synchronised to an externally provided time signature across Ethernet using the IEEE-1588 protocol. In yet another embodiment the USB device's clock is synchronised to a timebase derived from a Global Positioning System (GPS) synchronised clock.

All of the above systems work within the bounds of conventional USB 2.0 and as such are limited in several areas. USB 2.0 is limited in range by the device response timeout. This is the window of time that the USB Host Controller allocates for receipt of a signal from a given USB device in response to a request from said USB Host Controller. The physical reach of USB 2.0 is therefore approximately 25 m.

The USB 3.0 specification was released in November 2008 and is also focussed on consumer applications. The USB 3.0 specification makes significant changes to the architecture of USB. In particular, the background art synchronisation schemes discussed above will not work with the new 5 Gb/s protocol (termed 'SuperSpeed USB') because it does away with the broadcast mechanism for SOF packets.

USB 3.0 defines two parallel and independent USB busses on the same connection cable. Firstly, the USB 2.0 bus remains unchanged (for backward compatibility) and offers Low Speed (1.5 Mb/s), Full Speed (12 Mb/s) and High Speed (480 Mb/s) protocols. The second bus—for 5 Gb/s traffic—provides the SuperSpeed USB. These busses operate independently, except that operation of the busses to a given USB device is mutually exclusive. That is, if a SuperSpeed connection is possible, then the USB 2.0 bus in disconnected to that device.

The dual-bus architecture of USB 3.0 is depicted schematically at 10 in FIG. 1. Personal Computer 12, containing USB Host Controller 14, is connected to USB 3.0 Hub 16 by first USB 3.0-compliant cable 18; USB 3.0 device 20 is connected to a downstream port 22 of USB 3.0 Hub 16 by second USB 3.0-compliant cable 24.

USB Host Controller 14 contains both a USB 2.0 Host 26 and a SuperSpeed Host 28. These two hosts 26, 28 are independent of one another, and each host 26, 28 is capable of connecting up to 127 devices (including hubs). USB 3.0-compliant cables are compound cables, containing a USB 2.0-compliant cable and a series of shielded conductors capable of transmitting SuperSpeed signals. Hence, USB 3.0-compliant cable 18 comprises USB 2.0-compliant cable 30 and shielded conductors 32.

USB 3.0 Hub 16 contains both a USB 2.0 Hub function 34 and a SuperSpeed Hub function 36, each connected directly to its respective Host 26, 28 by compound cable 18. USB 3.0 device 20 contains both a USB 2.0 device function 38 and a SuperSpeed device function 40, each connected back to its respective hub function 34, 36 of USB 3.0 Hub 16 by compound cable 24.

At enumeration of USB 3.0 device 20, SuperSpeed Host 28 checks for the presence of a SuperSpeed device function (40). If a SuperSpeed device is found, then a connection is established. If a SuperSpeed device is not found (as in the case where only a USB 2.0 device is connected to port 22), then the USB 2.0 Host 26 checks for the presence of a USB 2.0 device function (38) at device 20. Once the Host Controller 14 determines which device function is connected, it tells the USB 3.0 Hub 16 to only enable communication for downstream port 22 corresponding to whether the USB 2.0 device function 38 or SuperSpeed device function 40 is attached. This means that only one of the two parallel busses is in operation at any one time to an end device such as USB 3.0 device 20.

Furthermore, SuperSpeed USB has a different architecture from that of the USB 2.0 bus. Very high speed communication systems consume large amounts of power owing to high bit rates. A design requirement of SuperSpeed USB was lower power consumption, to extend the battery life of user devices. This has resulted in a change from the previous broadcast design of the USB 2.0: SuperSpeed is not a broadcast bus, but rather directs communication packets to a specific node in the system and shuts down communication on idle links.

This significantly affects any extension of the synchronisation schemes of, for example, U.S. patent application Ser. No. 12/279,328, whose method and apparatus for synchronising devices is based on a broadcast clock carrier signal that is delivered to each device on the bus, which is unsuitable in SuperSpeed USB.

A SuperSpeed Hub function acts as a device to the host (or upstream port) and as a host to the device (or downstream port). This means that the SuperSpeed Hub function acts to buffer and schedule transactions on its downstream ports rather than merely acting as a repeater. Similarly, the SuperSpeed Hub function does so with scheduling transmissions on the upstream port. A heavily burdened Hub function can therefore add significant non-deterministic delays in packet transmission through the system. This also precludes the use of USB 2.0 synchronisation schemes such as that of U.S. patent application Ser. No. 12/279,328 from operating on SuperSpeed USB.

The crude Isochronous synchronisation of USB 2.0 has been significantly improved in the USB 3.0 specification. Opening an Isochronous communication pipe between a Host Controller and a USB device guarantees a fixed bandwidth allocation in each Service Interval for the communication pipe. The Isochronous Protocol of USB 3.0 contains a so-called Isochronous Timestamp Packet (ITP), which is sent at somewhat regular intervals to each Isochronous Endpoint and which contains a timestamp of the beginning of ITP transmission by the USB Host Physical Layer (Phy) in the time domain of the Host Controller. The Isochronous Timestamp Packet is accurate to about 25 ns. SuperSpeed USB shuts down idle links to conserve power, but links must be active in order to receive an Isochronous Timestamp Packet. The Host Controller must therefore guarantee that all links to a device are in full active mode (termed power state U0) before transmission of the Isochronous Timestamp Packet.

Unfortunately the Isochronous Timestamp packet can be delayed in propagation down the USB network. USB 3.0 also does not provide a way of determining the propagation time of packets in SuperSpeed USB and hence no way of accurately knowing the phase relationship between time domains on different USB devices. Phase differences of several hundred nanoseconds are expected to be a best case scenario with SuperSpeed USB making it impractical for instrumentation or other precision timing requirements.

U.S. Pat. No. 5,566,180 (Eidson et al.) discloses a method of synchronising clocks in which a series of devices on a communication network transmit their local time to each other and network propagation time is determined by the ensemble of messages. Further disclosures by Eidson (U.S. Pat. Nos. 6,278,710, 6,665,316, 6,741,952 and 7,251,199) extend this concept but merely work toward a synchronisation scheme in which a constant stream of synchronising messages are transferred between each of the nodes of a distributed instrument network via Ethernet. This continual messaging consumes bandwidth and limits the accuracy of the possible synchronisation to several hundred nano-seconds in a point-to-point arrangement and substantially lower accuracy (typically micro-seconds) in a conventional switched subnet.

It should be understood that the terms 'clock signals' and 'synchronisation' in this disclosure are used to refer to clock signals, trigger signals, delay compensation information and propagation time measurement messages. It should also be understood that a 'notion of time' in this disclosure is used to denote an epoch or 'real time' and can also be used to refer to the combination of a clock signal and an associated epoch.

SUMMARY OF THE INVENTION

It is a general object of the present invention to enable precision synchronisation of a plurality USB devices, up to a predefined maximum, according to the USB3 Specification.

In a first broad aspect, the present invention provides a 1. A method of determining the downstream propagation time of signals from a USB Host Controller across one or more USB cables and one or more USB Hubs to a SuperSpeed USB device, comprising:

opening at least one Isochronous communication pipe between the Host Controller and the SuperSpeed USB device;

ensuring that (i.e. placing in or checking that) the SuperSpeed USB device is in link state U0 in preparation for receiving an Isochronous Timestamp Packet (ITP);

controlling the USB Host Controller to send a plurality of Isochronous Timestamp Packets (which, by their nature, are roughly periodic) across the Isochronous communication pipe, the Isochronous Timestamp Packets containing respective first timestamps indicative of times at which the Host Controller generated the respective Isochronous Timestamp Packets;

locking a local clock of the SuperSpeed USB device to information that comprises the first timestamp, derived from one or more of the Isochronous Timestamp Packets (which may be derived, however, from a plurality of the Isochronous Timestamp Packets for greater accuracy), the locking being in respect of frequency such that the local clock is syntonised to a timebase of the USB Host Controller and a notion of time of the local clock is substantially synchronised to a notion of time of the USB Host Controller but with a constant phase delay equal to an average downstream propagation time of the plurality of Isochronous Timestamp Packets from the USB Host Controller to the SuperSpeed USB device;

the SuperSpeed USB device transmitting a plurality of signals to the USB Host Controller, each of the signals containing a second timestamp indicative of a local time in the time domain of the SuperSpeed USB device when the respective signal was generated by the SuperSpeed device;

the USB Host Controller creating a third timestamp indicative of a time of reception of the respective signals from the SuperSpeed USB device;

the USB Host Controller determining a time period from one or more respective time differences between corresponding second and third timestamps (averaged, for example, when plural differences are used), the time period being indicative of a sum of a downstream propagation time and an upstream propagation time; and determining the downstream propagation time from the time period (for example, as half of the time period by assuming symmetrical upstream and downstream propagation times).

Thus, this method permits a determination of cable propagation time and thereby accurately to phase align the clocks of a plurality of USB devices attached to a common Host Controller. In order to achieve this, the relative propagation times of timing signals between a common Host Controller and the plurality of USB devices must be determined. The relative propagation times are then used to adjust the phase of each of the plurality of clocks to provide a system of synchronised devices. Accordingly the present invention provides a loop-back measurement of cable and hub signal propagation time in a SuperSpeed USB network.

In one embodiment, the method comprises ignoring the determination of downstream propagation time when the respective lsochronous Timestamp Packets contain a Packet Delayed flag.

The method may comprise making a plurality of like determinations of the downstream propagation time. The method may further comprise selecting a modal peak in the multi-modal distribution of downstream propagation time corresponding to non-delayed upstream signal propagation as the downstream propagation time.

The signals transmitted by the SuperSpeed USB device may be transmitted across the lsochronous pipe, but alternatively across any transfer type supported by USB.

In practice, a plurality of time differences will have a distribution of values, owing to several factors. Firstly, there will be a small stochastic error in reception and timestamping of any single signal, owing to reclocking jitter in each of the USB Hub devices. More significantly, any given communication package in either upstream or downstream directions may be delayed by a hub.

In the case of downstream packets, the lsochronous Timestamp Packet contains a Packet Delayed flag which is set by a hub on reclocking the lsochronous Timestamp Packet if the Hub has delayed retransmission for any reason. This allows delayed packets to be ignored from the process of synchronising the SuperSpeed USB device's local time. Upstream communication packets do not provide notification of hub delays, but hub delays are significantly larger than the stochastic errors, resulting in the distribution being substantially multi-modal. This allows delayed upstream packets to be ignored from the measurement of upstream propagation time.

According to this aspect, there is also provided a method of determining the downstream propagation time of signals from a selected point in a USB network (such as the USB Host Controller or a USB hub) across one or more USB cables and one or more USB Hubs to a first SuperSpeed USB device of a plurality of SuperSpeed USB devices, the method comprising:

ensuring that the first SuperSpeed USB device is in link state U0;

ensuring that the SuperSpeed USB devices other than the first SuperSpeed USB device are not in link state U0;

ensuring that no request is made to change the link state of any links in a USB network branch spanned by the selected point and the first SuperSpeed USB Device;

performing a plurality of round trip propagation time measurements for the first SuperSpeed USB device.

Thus, this embodiment reduces the uncertainty in signal propagation measurements caused by queuing of messages across the network.

This offers a significant increase in the certainty of cable propagation time measurements and therefore allows greater precision in controlling the phase of a synchronised clock of a USB device.

Some of the other one or more SuperSpeed USB devices may be unable to be synchronised according to this method, but they should still be precluded from communicating across the USB during the propagation time measurement so that the USB Hubs need not delay any signal propagation from queuing of messages.

In one embodiment, no traffic other than propagation time measurement traffic for first SuperSpeed USB device is present on the USB network when measuring the propagation time to minimize potential hub retransmission delays.

Compliance of the USB Host Controller is very tightly controlled. Modification of such a Host Controller to allow timestamping of the reception of communication packets from SuperSpeed USB devices may be unrealistic or impractical. It is therefore desirable to measure the passage of signals at some other point in the USB network and timestamp messages accordingly at that point. Hence, it is desirable that a conventional USB Host Controller be employed, wherein there is no provision for timestamping the receipt of a communication packet.

Therefore, according to a second broad aspect, the present invention provides a method of determining the downstream propagation time of signals from a USB Host Controller to a SuperSpeed USB device in a USB network, comprising:

opening one or more lsochronous communication pipes between the Host Controller and the SuperSpeed USB device;

ensuring that the SuperSpeed USB device is in link state U0 in preparation for receiving an lsochronous Timestamp Packet (ITP);

the USB Host Controller sending a plurality of multicast periodic lsochronous Timestamp Packets across the lsochronous communication pipes, each of the lsochronous Timestamp Packets containing a respective first timestamp indicative of a local time of the USB Host Controller when the USB Host Controller generated each of the plurality of lsochronous Timestamp Packets;

locking a local clock of the SuperSpeed USB device to information including the first timestamp derived from one or more of the lsochronous Timestamp Packets (ITP), the locking being in respect of frequency and in phase with reception of the lsochronous Timestamp Packets, such that the local clock is syntonised to a timebase of the USB Host Controller and a notion of time of the local clock is substantially synchronised to a notion of time of the Host Controller, but with a constant phase delay equal to the average downstream propagation time of the lsochronous Timestamp Packets from the USB Host Controller to the SuperSpeed USB device; and designating a master USB device in the USB network;

locking a measurement clock local to the Master USB device by any of the methods of this invention described herein, so that the measurement clock is syntonised and synchronised to the notion of time of the USB Host Controller;

the SuperSpeed USB device transmitting a plurality of signals to the USB Host Controller, each of the signals containing respective second timestamps indicative of a local time in a time domain of the SuperSpeed USB device when the respective signal was generated by the SuperSpeed USB device;

monitoring SuperSpeed USB traffic with the master USB device for the signals from the SuperSpeed USB device;

the master USB Device creating respective third timestamps indicative of respective times of detection of the signals from the SuperSpeed USB device;

the master USB device decoding one or more respective second timestamps from the SuperSpeed USB traffic corresponding to the respective signals for which the respective third timestamps were generated;

the master USB Device determining a time period from one or more respective time differences between corresponding second and third timestamps (averaged, for example, when plural differences are used), the time period being indicative of a sum of a downstream propagation time and an upstream propagation time; and determining the downstream propagation time from the time period (for example, as half of the time period by assuming symmetrical upstream and downstream propagation times).

Thus, cable propagation time may be determined.

In an embodiment, the measurement clock is syntonised to the notion of time of the USB Host Controller.

In an embodiment, the measurement clock is syntonised to the notion of time of the USB Host Controller.

In an embodiment, the method further comprises:

making a plurality of determinations of the downstream propagation time; and deriving an improved determination of the downstream propagation time by applying one or more statistical techniques to the determinations of downstream propagation time.

In an embodiment, the method further comprises synchronising the phase of the local clock of the USB device.

The measurement clock may be syntonised and synchronised to the notion of time of the USB Host Controller by a SuperSpeed USB synchronisation channel, a non-SuperSpeed USB synchronisation channel or any other suitable means including reception of a timing signal from an external source.

In one embodiment, the master USB device is attached near the top of the USB network.

The method may include (and possibly statistically analyzing) a plurality determinations of propagation time to improve accuracy of measurement of the downstream propagation time. The method may include selecting a modal peak in the multi-modal distribution of downstream propagation time corresponding to non-delayed upstream signal propagation as the downstream propagation time.

The method of this embodiment allows synchronisation, or phase adjustment, of the notion of time of the SuperSpeed USB device to match the notion of time of the master USB Device, and by reference back to the notion of time of the USB Host Controller if desired.

According to this aspect, there is also provided a method of determining the downstream propagation time of signals from a USB Host Controller to a plurality of SuperSpeed USB devices in a USB network, comprising:

applying the method described above to each of the SuperSpeed USB devices;

wherein the SuperSpeed USB devices contain respective local clock that are synchronised to a common notion of time.

According to a third broad aspect, the present invention provides an apparatus for determining the relative downstream propagation time of signals from a USB Host Controller to a SuperSpeed USB device, the apparatus comprising:

a SuperSpeed-capable upstream port adapted to provide a SuperSpeed upstream connection and a non-SuperSpeed upstream connection;

a plurality of SuperSpeed-capable downstream ports;

first circuitry, adapted to perform a USB hub function providing connectivity to the upstream port and the downstream ports for both SuperSpeed and non-SuperSpeed connections;

second circuitry, adapted to perform one or more SuperSpeed or non-SuperSpeed USB device functions, and connected to at least one of the downstream ports;

third circuitry, adapted to decode synchronisation information (comprising, for example, one or more periodic signal structures or timestamps, or a trigger signal, a clock signal and clock phase information) from either the SuperSpeed or the non-SuperSpeed upstream connection;

a local measurement clock synchronised to a notion of time of the USB Host Controller with the third circuitry (which, as will be appreciated by those in the art, results in the synchronisation containing a constant but generally unknown phase offset from the true notion of time of the USB Host Controller); and fourth circuitry, adapted to monitor SuperSpeed USB traffic for a timestamp signal with a first timestamp received at one of the downstream ports;

fifth circuitry, adapted to create a second timestamp corresponding to detection of the timestamp signal;

sixth circuitry, adapted to decode the first timestamp from the SuperSpeed USB traffic corresponding to a data packet or packets for which the second timestamp was generated; and seventh circuitry or a computational mechanism, adapted to determine a time difference between the first and second timestamps in the time domain of the local measurement clock.

Thus, cable propagation time may be determined.

According to a fourth broad aspect, the present invention provides a method of synchronising the operation of a plurality of SuperSpeed USB devices with respective local clocks in a USB network, comprising:

syntonising the local clocks of the SuperSpeed USB devices;

synchronising, or phase aligning, respective notions of time of the local clocks; and maintaining syntonisation of the local clocks, and thereby a synchronous notion of time;

whereby the SuperSpeed USB devices are synchronised and adapted to enable coordinated operation of a plurality of functions on the SuperSpeed USB devices, synchronised to a common time domain.

Thus, the plurality of SuperSpeed USB devices may be synchronised. In yet another type of synchronisation, utilising a Precision Time Protocol (PTP), background art methods require constant messaging in order to synchronise free running oscillators on each device, whereas according to this aspect synchronisation or phase alignment of the local clock may be performed only once. In a particular embodiment, one clock is syntonised (or slaved) to another clock. When the clocks are phase aligned with a common notion of time, the syntonisation algorithms allow the clocks to remain synchronised with reduced messaging overhead.

In one embodiment, the SuperSpeed USB devices are synchronised to a notion of time and timebase of a USB Host Controller of the USB network.

Furthermore, the method may be employed with any communication bus whereby syntonisation information is readily available at substantially all of the time. In this case, any communication bus such as a synchronous form of Ethernet, PXI, PXI-express, USB, wireless communication means or any other communication means can deliver syntonising signals to a plurality of attached devices and only synchronise the notion of time of each of the plurality of devices only once.

In a further embodiment the USB devices are synchronised to a common notion of time by a common external trigger signal that is applied synchronously to each syntonised USB device.

In an embodiment, syntonising the local clocks comprises locking the local clocks to a periodic data structure in the USB data stream.

In an embodiment, syntonising the local clocks comprises locking the local clocks to a SuperSpeed USB Isochronous Timestamp Packet. In an embodiment, synchronising the phase of the syntonised clocks occurs only once.

In an embodiment, the synchronisation method further comprises:
   determining the downstream propagation time of signals according to the method described above; and
   phase adjusting the local clocks by an amount determined by the downstream propagation time.

According to this aspect, there is also provided a method of synchronising the operation of a plurality of devices with respective local clocks, the devices being attached to a common bus, comprising:
   syntonising the local clocks of the devices;
   synchronising, or phase aligning, respective notions of time of the local clocks; and
   maintaining syntonisation of the local clocks, and thereby a synchronous notion of time of the local clocks;
   whereby the devices are synchronised and adapted to enable coordinated operation of a plurality of functions on the plurality of devices.

It should be noted that all the various features of each of the above aspects of the invention can be combined as suitable and desired.

Furthermore, it should be noted that the invention also provides apparatuses and systems arranged to perform each of the methods of the invention described above.

In addition, apparatuses according to the invention can be embodied in various ways. For example, such devices could be constructed in the form of multiple components on a printed circuit or printed wiring board, on a ceramic substrate or at the semiconductor level, that is, as a single silicon (or other semiconductor material) chip.

BRIEF DESCRIPTION OF THE DRAWINGS

In order that the present invention may be more clearly ascertained, embodiments will now be described, by way of example, with reference to the accompanying drawing, in which.

DETAILED DESCRIPTION OF THE INVENTION

Figure 1:
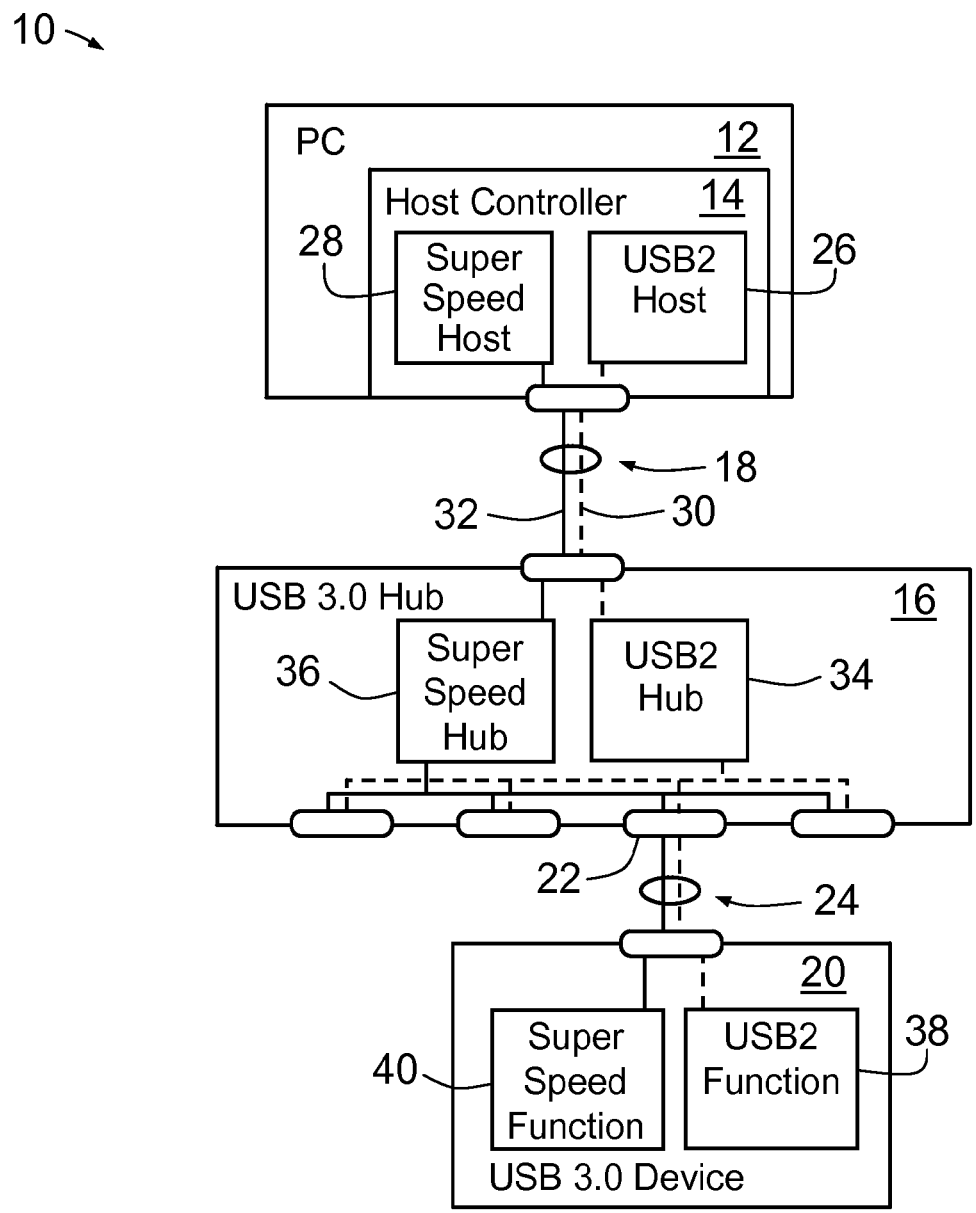
FIG. 1 is a schematic diagram of the dual-bus architecture of USB3 according to the background art.
Figure 2:
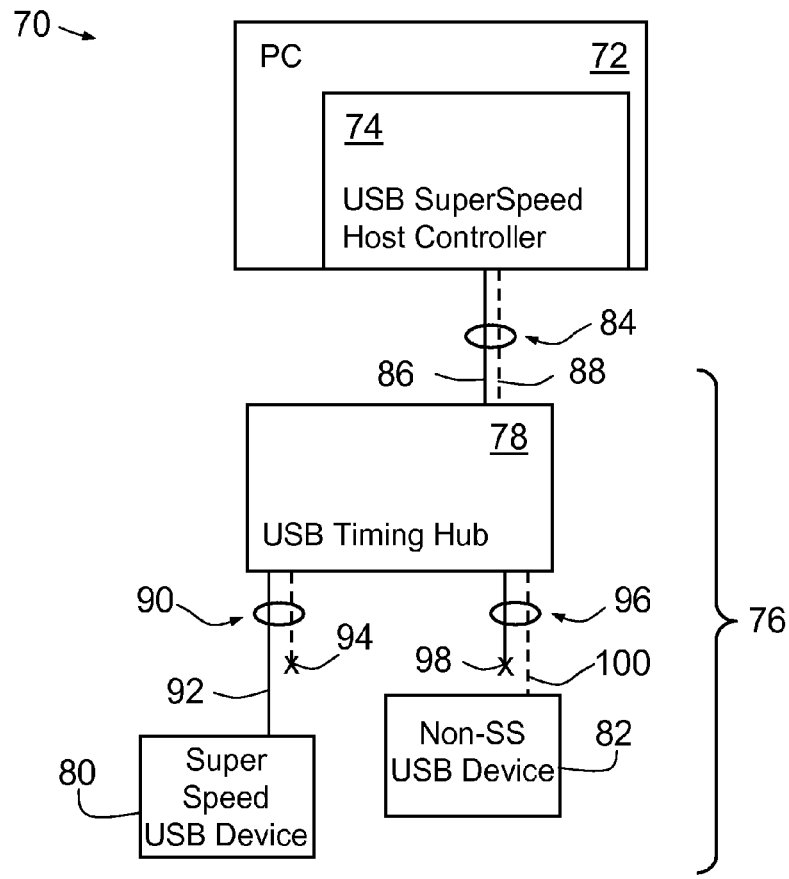
FIG. 2 is a schematic diagram of a synchronised USB according to an embodiment of the present invention, containing both SuperSpeed and non-SuperSpeed USB devices.

A synchronised USB according to a first embodiment of the present invention is shown schematically at 70 in FIG. 2, provided in a personal computer (PC) 72. PC 72 includes a SuperSpeed USB Host Controller 74 that is connected to a network 76 containing a SuperSpeed USB Timing Hub 78, a SuperSpeed USB device 80 and a non-SuperSpeed USB device 82. USB Host Controller 74 is connected to USB Timing Hub 78 by compound USB cable 84 comprising SuperSpeed conductors 86 and non-SuperSpeed conductors 88.

USB Timing Hub 78 supports attachment of both a SuperSpeed USB device 80 and non-SuperSpeed USB device 82, so both SuperSpeed conductors 86 and non-SuperSpeed conductors 88 carry signals between SuperSpeed USB Host Controller 74 and USB Timing Hub 78.

SuperSpeed USB device 80 is connected to USB Timing Hub 78 by SuperSpeed-compliant compound USB cable 90, comprising SuperSpeed conductors 92 and non-SuperSpeed conductors 94. As device USB 80 is a SuperSpeed USB device, USB Timing Hub 78 turns off non-SuperSpeed data traffic to conductors 94, so the connection between SuperSpeed device 80 and USB Timing Hub 78 is provided by SuperSpeed conductors 92 alone. Non-SuperSpeed USB device 82 is connected to USB Timing Hub 78 by SuperSpeed-compliant compound USB cable 96, comprising SuperSpeed conductors 98 and non-SuperSpeed conductors 100. There are no signals across the SuperSpeed USB conductors 98 of cable 96 while a data connection is being made to Non-SuperSpeed USB device 82 by the non-SuperSpeed conductors 100.

In this example, SuperSpeed conductors 92 (of compound USB cable 90) between USB Timing Hub 78 and SuperSpeed USB device 80 are adapted to provide a SuperSpeed synchronisation channel, whilst non-SuperSpeed cable segment 100 (of compound USB cable 96) between USB Timing Hub 78 and non-SuperSpeed USB device 82 can be said to provide a non-SuperSpeed synchronisation channel.

According to this embodiment, SuperSpeed USB device 80 is synchronised to non-SuperSpeed USB device 82. Frames in non-SuperSpeed USB traffic have a substantially constant phase relationship with the Isochronous SuperSpeed Timestamp packets.

Figure 3A:
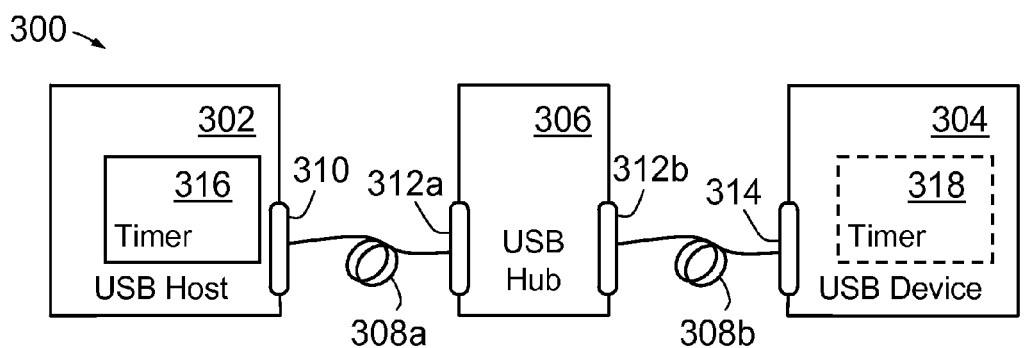
FIG. 3A is a schematic representation of a USB network according to an embodiment of the present invention.

FIG. 3A is a schematic view of a USB network 300 according to this embodiment, illustrating methods of determining the propagation time of signals across a USB network. USB network 300 comprises a first device in the form of a USB Host Controller 302, a second device in the form of a USB device 304, a USB hub 306 and a pair of USB cables 308a, 308b that connect USB Host 302 to USB device 304 (via port 310 of USB Host Controller 302, port 312a of USB Hub 306, port 312b of USB Hub 306 and port 314 of USB device 304).

Figure 3B:
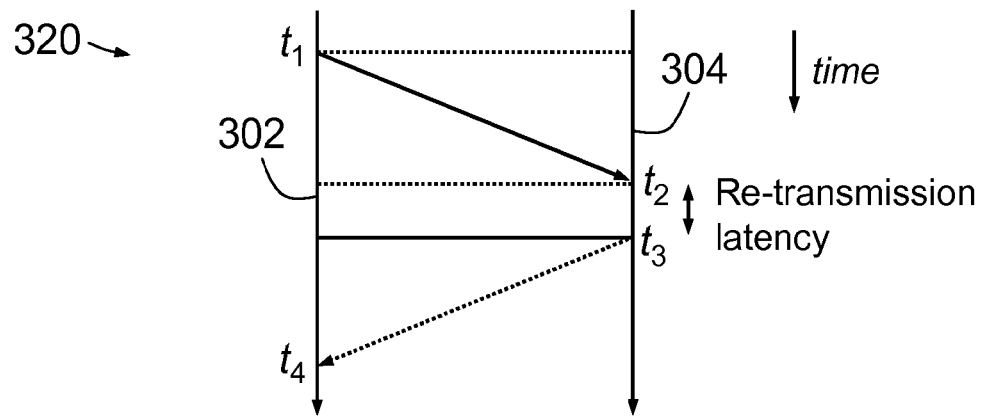
FIG. 3B shows the timing diagram for propagation time measurements between the link partners USB network of FIG. 3A.

FIG. 3B is a schematic timing diagram 320 of cable propagation loop-time measurements for the configuration of FIG. 3A, according to the embodiment of that figure. It should be noted that, although this embodiment comprises a USB network, the following approach may be applied—as will be appreciated by those skilled in the art—to any communication network.

According to this embodiment, the first device, USB Host Controller 302, transmits a message to the second device, USB device 304, and simultaneously starts its timer 316 (i.e. of USB Host Controller 302) at time $t_1$ (in the time domain of USB Host Controller 302). This message is received at the second device (i.e. USB device 304) at time $t_2$ (in the time domain of USB device 304). After some internal retransmission latency, the message is retransmitted at time $t_3$ (in the time domain of USB device 304). When the message is received by USB Host Controller 302 at $t_4$, USB Host Controller 302 stops its timer 316. The total loop time is given by ($t_4$-$t_1$) in the time domain of USB Host Controller 302, which includes the retransmission latency at USB device 304. The cable propagation time (arising from propagation in USB cables 308a, 308b and through USB hub 306) is given by half of the total loop time (after latency has been removed). Retransmission Latency may be estimated based on knowledge of how many bits are consumed in message detection before retransmission may occur.

In a variation of this embodiment of the present invention, USB device 304 also has a timer, timer 318. In this variation, timer 318 of USB 304 starts at $t_2$ when the aforementioned message is received from USB Host Controller 302 and stops at time $t_3$ when retransmission of that message occurs. In this case the total loop time is given by ($t_4$-$t_2$)−($t_3$-$t_2$). It should be noted that timers 316 and 318 are operating in different time domains. It is therefore advantageous that the local clocks of USB Host Controller 302 and USB device 304 are synchronised, or at least syntonised, for greatest accuracy.

Figure 4:
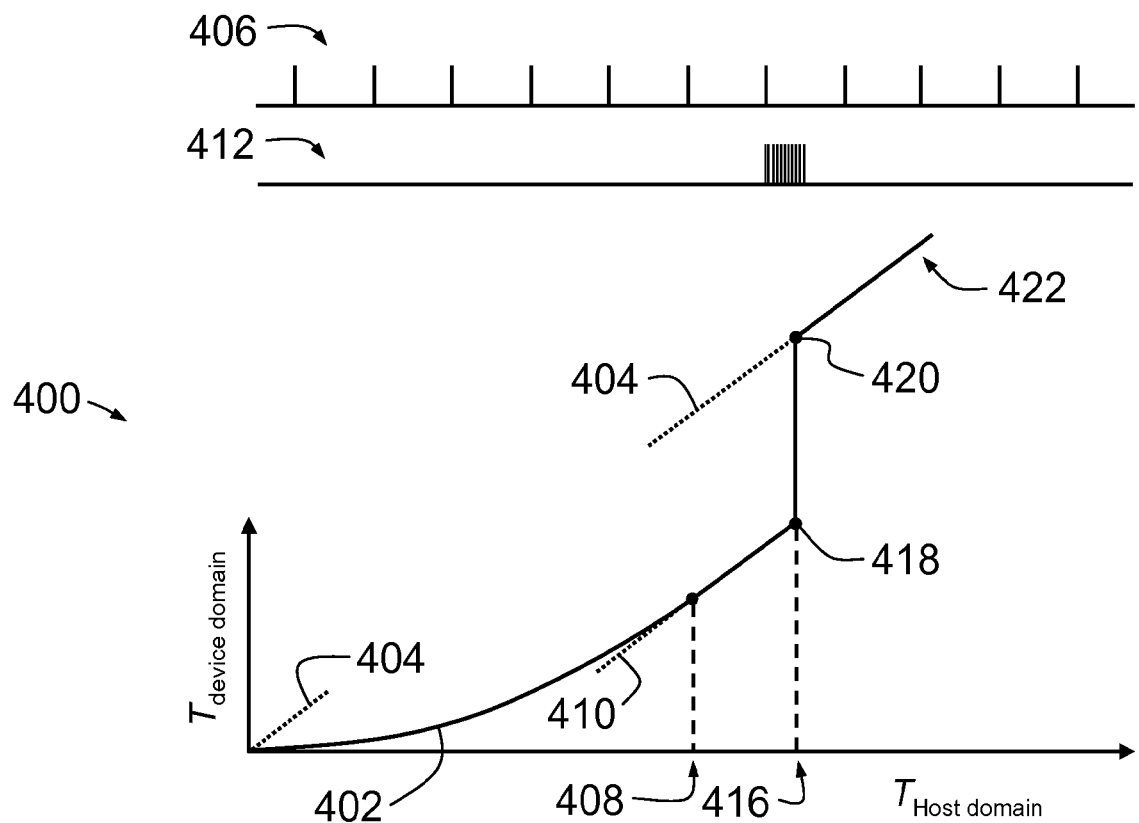
FIG. 4 is a graphical representation of a synchronisation method according to an embodiment of the present invention.

FIG. 4 illustrates a synchronisation method according to another embodiment of the present invention. The lower register of FIG. 4 contains a plot 402 of time in a time domain ($T_{device\ domain}$) of a USB device against time in a time domain ($T_{Host\ domain}$) of a USB Host. If the two time domains were syntonised and synchronised, curve 402 would be a straight line 404 passing through the origin.

Referring to the upper register of FIG. 4, in a typical scenario the USB Host sends a plurality of substantially periodic syntonisation signals 406 to the USB device. The local clock controller of the USB device adjusts the frequency of the local clock and the rate of evolution of the USB device's notion of time ($T_{device\ domain}$) begins to approach the rate of evolution of the USB Host's notion of time ($T_{Host\ domain}$). Referring to the lower register of FIG. 4, it will be seen that, at some point in time 408, the USB device's notion of time is evolving at the same rate as the USB Host's notion of time; that is, the gradient 410 of curve 402 is the same as that of straight line 404.

The two time domains are then said to be syntonised, but the notions of time are not the same, as may be seen from the vertical offset between the time curve 402 and the straight line 404 at time 408. At some point after the devices have been syntonised, however, Synchronisation Messaging 412 is sent between the USB Host and the USB device in order to facilitate synchronisation of their time domains. At point 416, the USB device's notion of time is adjusted such that it conforms to the USB Host's notion of time. This is shown by the transition of time from USB device time at 418 to 420 and the point where synchronisation occurs 416. The two clocks have been synchronised by a single messaging event at 416 and the plurality of syntonisation signals 406 ensure that the time domain of the USB device tracks that of the USB Host (at 422).

It will be apparent to those skilled in the art that Synchronisation Messaging 412 may be initiated be either party to determine the relative notions of local time. It is also possible to synchronise or adjust the time domain of either party in order to synchronise the pair.

Modifications within the scope of the invention may be readily effected by those skilled in the art. It is to be understood, therefore, that this invention is not limited to the particular embodiments described by way of example hereinabove and that combinations of the various embodiments described herein are readily apparent to those skilled in the art.

In the preceding description of the invention and in the claims that follow, except where the context requires otherwise owing to express language or necessary implication, the expression "Host Controller" embraces all forms of USB Host Controller, including standard USB Host controllers, USB-on-the-go Host Controllers and wireless USB Host Controllers.

In the preceding description of the invention and in the claims that follow, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to background art is not intended to imply that such background art forms or formed a part of the common general knowledge in any country.

The invention claimed is:

1. A method of determining a downstream propagation time of signals from a USB Host Controller to a SuperSpeed USB device in a USB network, comprising:

opening at least one Isochronous communication pipe between the Host Controller and the SuperSpeed USB device;

ensuring that the SuperSpeed USB device is in link state U0 in preparation for receiving an Isochronous Timestamp Packet (ITP);

controlling the USB Host Controller to send a plurality of Isochronous Timestamp Packets across the Isochronous communication pipe, the Isochronous Timestamp Packets containing respective first timestamps indicative of times at which the Host Controller generated the respective Isochronous Timestamp Packets;

frequency locking a local clock of the SuperSpeed USB device according to information derived from a plurality of the Isochronous Timestamp Packets such that the time domain of the local clock of the SuperSpeed USB device is syntonised to the time domain of a local clock of the USB Host Controller;

the SuperSpeed USB device transmitting a plurality of signals to the USB Host Controller;

creating a second timestamp indicative of a time of reception of the respective signals from the SuperSpeed USB device;

determining a time period from one or more respective time differences between corresponding first and second timestamps, the time period being indicative of a sum of a downstream propagation time and an upstream propagation time; and determining the downstream propagation time from the time period and a value of retransmission latency derived from the syntonised local clock of the SuperSpeed USB device.

2. A method as claimed in claim 1, wherein the determining of the time period from one or more respective time differences between corresponding first and second timestamps is performed by the USB Host Controller.

3. A method as claimed in claim 1, comprising making a plurality of like determinations of said downstream propagation time.

4. A method as claimed in claim 3, comprising selecting a modal peak in the multi-modal distribution of downstream propagation time corresponding to non-delayed upstream signal propagation as said downstream propagation time.

5. A method as claimed in claim 1, further comprising:
designating a master USB device in the USB network;

locking a measurement clock local to the master USB device, so that the measurement clock is syntonised and synchronised to the notion of time of the USB Host Controller;

wherein the steps of creating the second timestamp and determining a time period from one or more respective time differences between corresponding first and second timestamps is performed by the master USB device.

6. A method as claimed in claim 5, including locking said measurement clock to information that comprises the first timestamp, derived from one or more of the Isochronous Timestamp Packets, the locking being in respect of frequency such that the measurement clock is syntonised to a timebase of the USB Host Controller and a notion of time of the measurement clock is substantially synchronised to a notion of time of the USB Host Controller but with a phase delay equal to an average downstream propagation time of the plurality of Isochronous Timestamp Packets from the USB Host Controller to the Master USB device.

7. A method as claimed in claim 5, wherein said measurement clock is syntonised to the notion of time of said USB Host Controller.

8. A method as claimed claim 5, further comprising:
making a plurality of determinations of said downstream propagation time; and
deriving an improved determination of said downstream propagation time by applying one or more statistical techniques to said plurality of determinations of downstream propagation time.

9. A method as claimed in claim 5, further comprising synchronising the phase of said local clock of said USB device according to the determination of downstream propagation time.

10. A method of determining the downstream propagation time of signals from a USB Host Controller to a plurality of SuperSpeed USB devices in a USB network, comprising:
applying the method of claim 1 to one of said plurality of SuperSpeed USB devices;
wherein each of the plurality of SuperSpeed USB devices contain respective local clocks that are synchronised to a common notion of time.

11. A method of determining the downstream propagation time of signals according to claim 10, further comprising:
ensuring that said SuperSpeed USB devices other than said one of SuperSpeed USB devices are not in link state U0;
ensuring that no request is made to change the link state of any links in a USB network branch spanned by said selected point and said one of the SuperSpeed USB Devices.

12. A method according to claim 1, wherein the SuperSpeed USB device transmitting a plurality of signals to the USB Host Controller includes transmitting, when the SuperSpeed USB device is syntonised to the time domain of a local clock of the USB Host Controller, at least one signal including:
a third timestamp indicative of a time of reception of a respective Isochronous Timestamp Packet from the USB Host Controller; and
a fourth timestamp indicative of a time of transmission of the respective signal from the USB Host Controller;
and wherein the retransmission latency derived from the syntonised local clock of the SuperSpeed USB device is determined as a time difference between third and fourth timestamps.

13. A method as claimed in claim 11, wherein no traffic other than propagation time measurement traffic for said one of the SuperSpeed USB devices is present on the USB network when measuring the propagation time to minimize potential hub retransmission delays.

14. A method of synchronising the operation of a plurality of SuperSpeed USB devices with respective local clocks in a USB network, comprising:
syntonising the local clocks of said SuperSpeed USB devices;
synchronising, or phase aligning, respective notions of time of said local clocks; and
maintaining syntonisation of said local clocks, and thereby a synchronous notion of time;
wherein syntonising said local clocks comprises frequency locking said local clocks either to a periodic data structure in said USB data stream or to a SuperSpeed USB Isochronous Timestamp Packet, and
wherein synchronising, or phase aligning said respective notions of time of said local clocks comprises determining a downstream propagation time for each of the plurality of SuperSpeed devices and phase adjusting said syntonised local clocks by an amount determined by said respective downstream propagation time such that said SuperSpeed USB devices are synchronised to a common time domain to enable coordinated operation of a plurality of functions.

15. A method as claimed in claim 14, wherein synchronising the phase of said syntonised clocks occurs only once.

16. A method as claimed in claim 14, further comprising:
determining the downstream propagation time of signals according to
method of claim 1; and
phase adjusting said local clocks by an amount determined by said downstream propagation timer to thereby synchronise said clocks.

17. A method as claimed in claim 16, wherein synchronising the phase of said syntonised clocks occurs only once.

* * * * *